Oct. 30, 1962 W. J. READING 3,060,794
EGG CANDLER
Filed Feb. 14, 1958 3 Sheets-Sheet 1

INVENTOR.
WALTER J. READING
BY
Beau, Brooks, Buckley & Beau
ATTORNEYS

Oct. 30, 1962 W. J. READING 3,060,794
EGG CANDLER
Filed Feb. 14, 1958 3 Sheets-Sheet 3

INVENTOR.
WALTER J. READING
BY
Beau, Brooks, Buckley & Beau
ATTORNEYS

3,060,794
Patented Oct. 30, 1962

3,060,794
EGG CANDLER
Walter J. Reading, Agency Road, R.R. 1, Ottumwa, Iowa
Filed Feb. 14, 1958, Ser. No. 715,401
4 Claims. (Cl. 88—14.8)

My invention relates to egg handling machines and in particular to a mass candling device.

As is well known to those skilled in the art, when poultry eggs are produced by what is termed "Farm Fowls" and "Barnyard Fowls," the eggs are not usually marketed for a considerable length of time after gathering with the result that even Grade A eggs may deteriorate sufficiently to reduce them to Grade B or even Grade C before they are finally delivered to the packer. When this class of eggs is encountered, it is necessary to "Full Candle" each individual egg by holding it up to a source of light so that the contents of the egg may be inspected. However, when eggs are produced under controlled conditions, such as being gathered frequently; being cooled immediately after gathering; and produced by young hens that are scientifically fed and cared for, then Grade A eggs can be substantially uniformly produced. Such egg, because of the prompt and careful treatment need be inspected only for blood spots, meat spots and cracks. The individual eggs do not, therefore, have to be inspected individually, but a large number of them may be inspected at one time by what might be termed a "flash candler" by which a great number of eggs are exposed at the same time to a source of light.

A principal object of my invention is to provide means for holding a large number of eggs in a substantially horizontal plane beneath which is provided a strong source of light of an illumination system.

A further object is to provide a method of candling poultry eggs in which the source of light of the illumination system is so directed by means of baffles and so screened by means of shields that the inspector's eyes will be shielded from the source of light as the eggs are traveling over the inspection lights or when an egg is removed from the conveyor.

Another object is to provide means for intermittently conveying the eggs across the light source.

A further object is to provide means for accelerating the rate of turning the eggs during inspection thereof.

Moreover, it is an object to provide means for circulating cooler air through the casing containing the light source so as to avoid a rise in temperature of the eggs being inspected.

Furthermore, the invention contemplates the provision of baffles over the light source, whereby when an egg is removed from the conveyor, the light will not shine directly into the operator's eyes.

Another aspect of the invention is the provision of shielding means along the top of the conveyor, whereby the light coming through the space between the ends of the adjacent eggs will be blocked off.

Another aspect which characterizes my invention is the provision of the removable glass shield below the conveyor and above the source of light, whereby the contents of a broken egg will be deposited upon the glass, thus protecting the light source.

The above objects and advantages have been accomplished by the device shown in the accompanying drawings of which:

FIG. 4 is a fragmentary view taken on line IV—IV of FIG. 1;

FIG. 5 is an enlarged transverse sectional view taken on line V—V of FIG. 3;

FIG. 6 is a fragmentary enlarged sectional view taken on line VI—VI of FIG. 5;

FIG. 9 is a fragmentary side elevation of the roller conveyor driving mechanism.

Many of the details of the instant application are similar to those of my co-pending application, Serial No. 534,271, filed September 14, 1955, upon Egg Graders, now U. S. Patent No. 2,961,087. Since some of the details are common to the device of this application, they will not, therefore, be described in detail herein.

Figure 1:
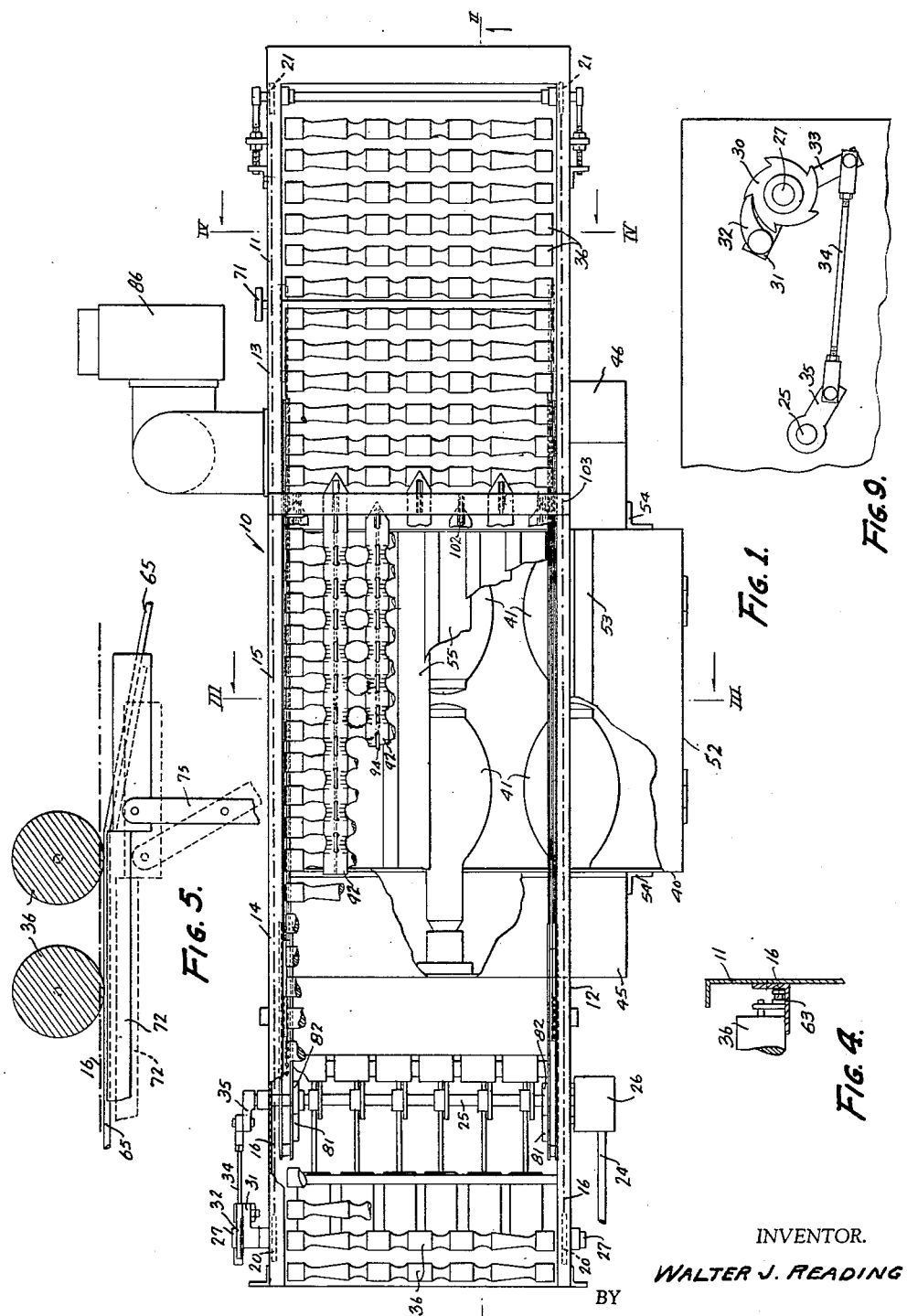
FIG. 1 is a plan view of my invention, portions thereof being broken away for clearness of the elevation.
Figure 2:
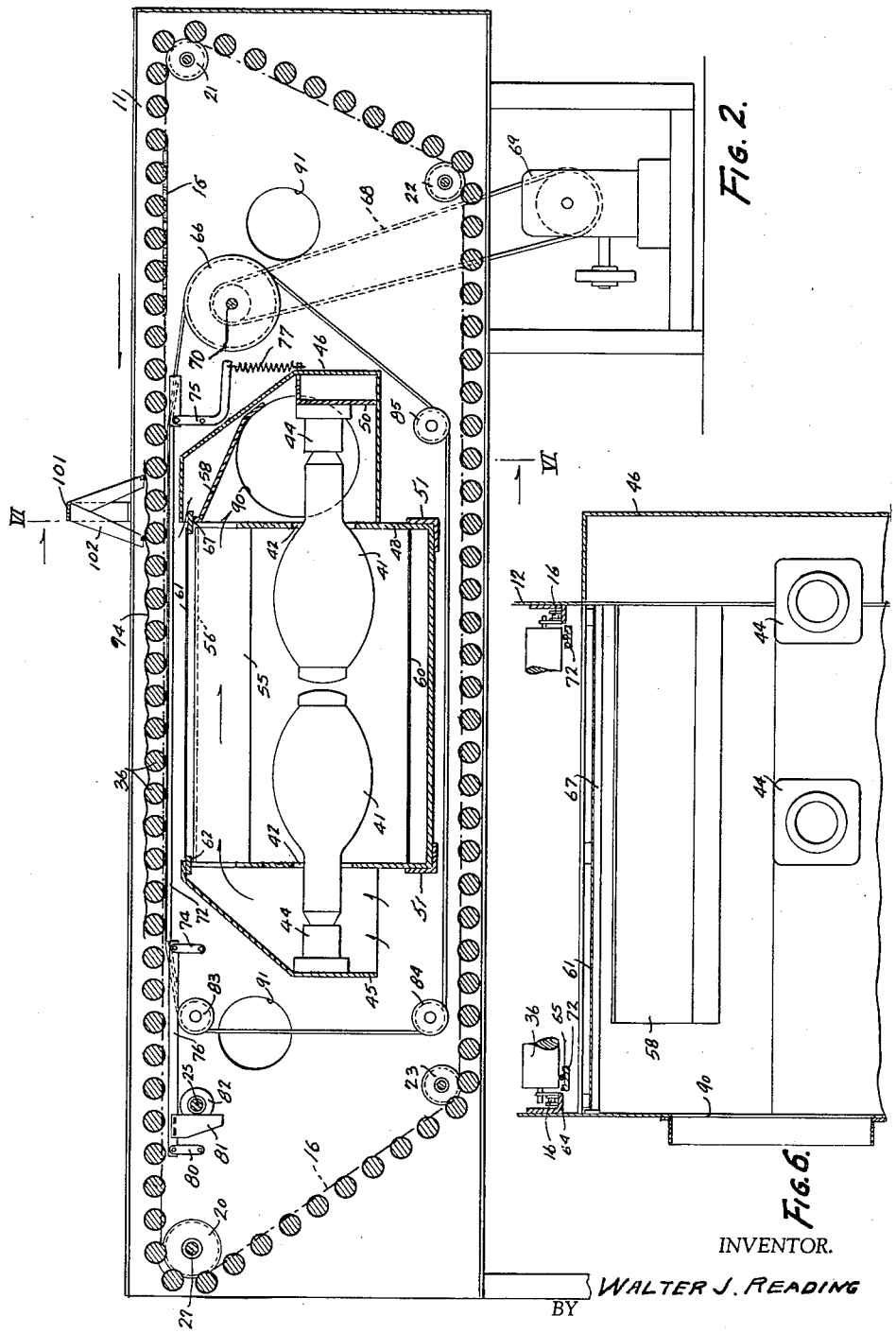
FIG. 2 is a side sectional view of the device taken on line II—II of FIG. 1.

Referring particularly to FIGS. 1 and 2, my egg candler device comprises a casing 10 formed preferably of two side plates 11 and 12 extending longitudinally the length of the device and opened at the top and bottom thereof. The casing 10 is formed with feeding portions 13 and 14 and with an intermediate inspection portion 15.

Extending from end to end of said casing is an endless-type conveyor which may include two conveyor chains 16 each mounted at one end upon a drive sprocket 20, and at the other end thereof passes over an adjustable sprocket 21. The under passes of the chains are supported by idler sprockets 22 and 23 mounted upon the side plates. The conveyor chains are moved by step-by-step motion in a direction as indicated by the arrow on FIG. 2 by any suitable main drive means having apparatus interconnected therewith and this is preferably accomplished by a continuously rotating drive shaft 24 actuated by the main drive means in a manner to cause a constant rotation of a cam shaft 25 through a pair of gears (not shown) mounted within the gear case 26. The drive sprockets 20 are carried by a sprocket shaft 27 upon which is mounted a ratchet wheel 30, adjacent to which is a bellcrank 31 loosely mounted upon the shaft and carrying a ratchet pawl 32 engageable with the teeth of the ratchet wheel 30. The bellcrank is formed with a downwardly extending crank arm 33 which is connected by means of an adjustable link 34 to a crank arm 35 mounted at the end of the cam shaft 25.

A series of egg-supporting rollers 36 are suitably connected at their ends to the conveyor chains 16 in rotatable manner and these rollers, together with the chains, are moved forwardly in step-by-step manner as just above described. The rollers are spaced apart and are provided with circular grooves for aligning and supporting eggs therebetween. The rollers are preferably coated with rubber or the like to provide adequate cushioning and gripping surfaces.

The inspection portion 15 of my device is located between the feeding portions 13 and 14 whereat their is provided an illumination system which may include, as illustrated, a light box 40 having a number of horizontally arranged mercury vapor lamps 41, preferably four in number, the neck portions of which extend through suitable aperture 42 formed in the side walls 43 of the light box and are screwed into suitable light sockets 44 mounted within socket housings 45 and 46 extending laterally of the casing 10, one located at each side of the light box. The socket housing 46 is wider than the socket housing 45 to accommodate the fan intake opening 90 formed in the side wall 11, and a bracket 50 is disposed therein for the sockets 44 to permit the proper positioning of the lamps extending from this housing.

The light box is slidably mounted upon slides 51 extending transversely across the casing, whereby the light box, after removal of the lamps 41 therefrom may be removed from the casing. The light box is inserted into the casing through the wall 12 thereof and a hinged cover 52 is extended across the front thereof which extends some distance forwardly from the exterior casing of the side wall. An angle 53 is carried at the top of the cover for bearing contact with the outer surface of the wall 12 when the cover is closed, and an angle iron 54 is carried at each side of the light box for contact with the socket housings 45 and 46 when the light box is in its operative position. If desired, gaskets may be provided at the contacting surfaces between the light box and the casing to seal the same against the entrance of air.

The illumination system may further include a series of spaced baffle plates 55 which are carried by the light box 40 with the baffle plates 55 being inclined backwardly at an angle and each provided with a backwardly extending portion 56 located in a substantially horizontal plane. These baffle plates extend upwardly away from the lamps 41 and serve to protect the eyes of the operator when an egg is removed from the inspection portion of the device. A suitable reflector 60 is located beneath the lamps 41 to cause the light therefrom to be reflected upwardly through the spaces between the baffle plates 55. A sheet of glass 61 is arranged over the top of the baffle plates 55 and is preferably carried by rubber coated shelves 62 and 67 located one at each side of the baffle plates and carried by the upper wall of the socket housings 45 and 46 respectively. These shelves are in spaced relation with the supporting surfaces of the socket housings whereby air will be drawn over the top surface of the glass in the manner hereinafter described. A resilient strip 59 is preferably carried by the wall 11 for contact by the glass 61 for sealing the back edge of the glass against passage of air at this place. A baffle plate 58 is carried by the socket housing 46 and preferably extends across the opening between the shelf 67 and upper wall of the housing.

Figure 3:
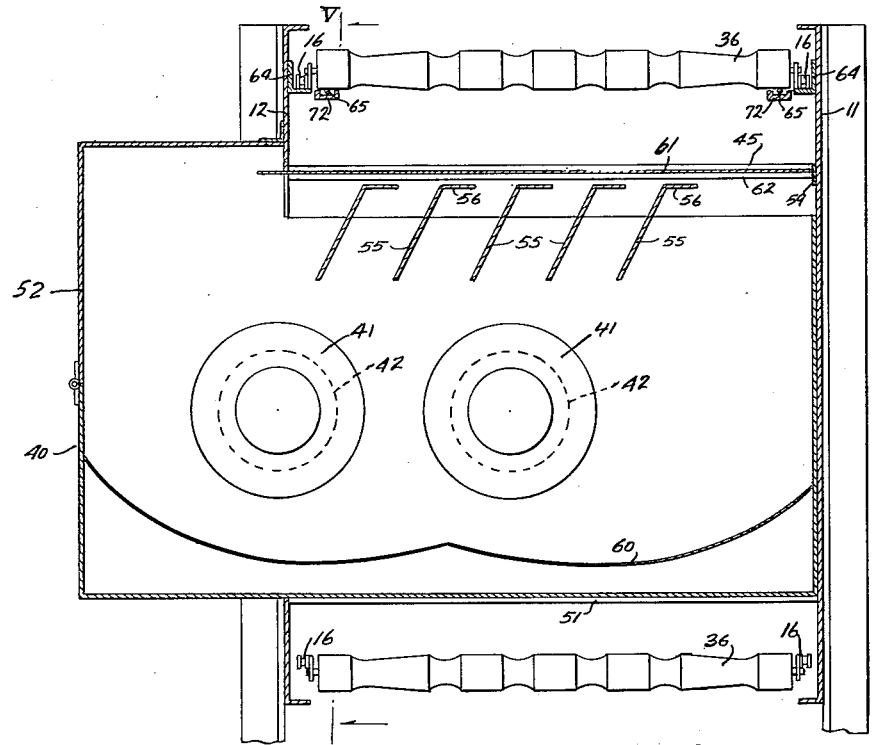
FIG. 3 is an enlarged transverse sectional view taken on line III—III of FIG. 1.
Figure 7:
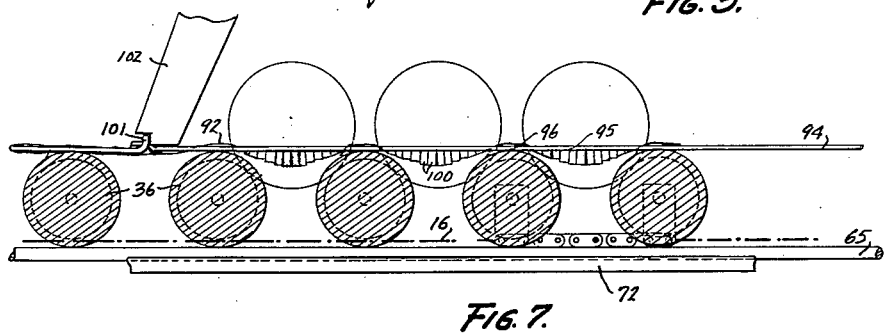
FIG. 7 is an enlarged fragmentary sectional view taken on line VII—VII of FIG. 8.
Figure 8:
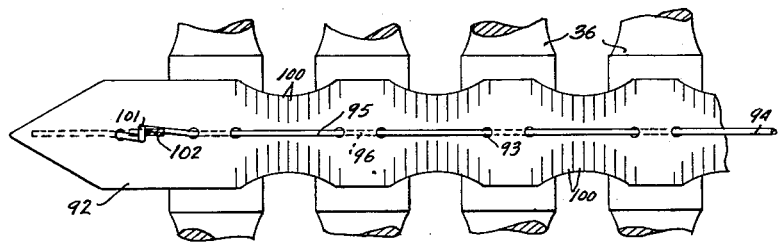
FIG. 8 is an enlarged fragmentary plan view of the flexible shields.

The rollers in the feeding portions 13 and 14, together with those portions of the conveyor chains carrying them, are supported in their passage through these portions by means of a support angle 63 as shown in FIG. 4. However, the rollers passing through the inspection portion 15 are supported solely by the conveyor chains 16 which ride over a supporting angle 64, the rollers being free to revolve upon their pivots in order that they can be rotated at an accelerated speed. In order to accomplish this rotation, I have provided structure for engaging the rollers 36 of the conveyor to rotate the rollers and thus rotate eggs which may be supported thereby in the region of the inspection portion 15 of the device with such structure including, in the preferred modification of the invention, means such as a spinner belt 65 at each side of the device extending longitudinally of the inspection portion and passing over drive sheaves 66. These sheaves are mounted upon a belt shaft 70 which extends through the side 11 of the casing and which is driven by means of a sprocket wheel 71 driven at a suitable speed by means of a chain or belt 68 connected to a standard speed reducer 69. Each of these belts pass over a reach rod 72 which is mounted upon pivot links 74 and 75, shown in their vertical or extended positions in FIG. 2. An extension 76 of each of said rods projects rearwardly and has its outer end mounted upon a link 80. A cam arm 81 is attached to each extension 76 and is arranged to have bearing contact with an actuating cam 82 which is mounted upon the cam shaft 25 and rotatable therewith. By means such as the cams and arms the reach rods are oscillated back and forth from their extended position shown in FIGS. 2 and 5 and to their retracted positions in dotted lines in FIG. 5 when the spinner belt is lowered and thereby withdrawn from contact with the rollers. The friction forces between the eggs and the rollers then cause the rollers and egg shells rotational movement to rapidly decelerate and stop, whereby the shell contents tend to continue rotation inside the shells. This facilitates detection to blood spots, etc. in the eggs during the inspection process, as is well known in the art. A helical spring 77, attached to arm 75, serves to maintain the cam arm 81 in contact with the cam 82 as the reach rod 72 is oscillated back and forth. The spinner belts 65 are slidably mounted upon the reach rods and are moved upwardly therewith when the rods are actuated to their extended positions, whereby the belts will contact the rollers and lift them off the rails 64 (FIG. 3) and rotate them, and the eggs carried thereby, at an accelerated speed to prepare the eggs for proper inspection. The spinner belts are passed over suitable idlers 83, 84 and 85 mounted on the inner surfaces of the side plates 11 and 12.

In order to keep the eggs from being overheated, I provided a suction fan 86 which is connected to a fan opening 90 formed in the side plate 11 preferably in registration with the socket housing 46. Air will, therefore, be drawn up through the socket housing 45 over the top of the glass plate 61 and through air openings 91 formed in the side walls 11 and 12 of the casing.

In order to protect the operator's eyes from the glare of the lamps 41, I provided a series of flexible shields 92 each comprising a strip of flexible material such as rubber extending lengthwise over the inspection portion of the casing and located over the ends of the adjacent eggs. These shields are formed lengthwise with a series of spaced perforations 93 through which a supporting wire 94 is alternately threaded, thus providing upper passes 95 and lower passes 96. The perforations are so spaced that the lower passes will be supported by the adjacent rollers underneath and the upper passes will be arranged between the eggs. The side positions of the shields which extend under the ends of the eggs are provided with tabs 100 for bearing against the surfaces of the eggs in light shielding manner. The supporting wire 94 at its front end is formed with a loop 101 for engagement with the lower end of a supporting arm 102 whereby the shield will be kept in longitudinal position and alignment. Each of the arms 102 is supported by a yoke 103 extending across the device from one side wall to the other. The supporting arms 102 extend downwardly and are inclined alternately forwardly and backwardly whereby the lower ends thereof are staggered so that long eggs will work themselves between and around the arms.

When my device is to be put into use, eggs are placed upon the rollers in the feeding portion 13 and they distribute themselves between the rollers and in the grooves formed therein. As herein pointed out, the rollers are advanced in step-by-step manner by the ratchet pawl 30 and the associated ratchet pawl. During the travel of the conveyor through this portion of the device, the rollers, supported by the angle support 63 will be caused to rotate each time the conveyor is advanced, thus aiding alignment of the eggs between the rollers. As the rollers leave the feeding portion 13 and enter the inspection portion 15, the conveyor chain 16 is supported by the angle support 64, the rollers being free to rotate upon their axes. Each time the forward movement of the roller is interrupted the cams 82 will cause the reach rods to be oscillated from their lower to their upper position as shown in FIG. 2. During this interrupted movement the spinner belt 65 will be brought into contact with the ends of the rollers, causing them to rotate the eggs at an accelerated speed. During this rotation, any blood or meat spots or any other imperfections in the eggs may be readily observed by the operator. As the cams 82 move the reach rods to assume their normal lower positions shown in dotted lines in FIG. 5, the conveyor will again be moved forward another step.

Air is drawn through the casing by means of the fan 86 and causes air to pass upwardly through the open bottom of the lamp housing 45, up through this housing and through the space between the shelf 62 and the housing wall. The air will thus pass over the top of the glass 61 and down into the socket housing 46 through the space between the shelf 67 and the upper wall of this housing. This air will not only counteract the tendency of the lamps to heat the eggs, but in the event of breakage of an egg, the contents will be carried over the top of the glass and into the housing 46, thereby protecting the lamps. The baffles 58 carried by the housing 46, extending over the space between the shelf 67 and the housing wall will collect the egg meat and convey it to the inlet of the fan.

The eggs thus candled will be conveyed over the rollers in the feeding portion 14 and are conducted to a grading device shown and described in my co-pending application.

Having thus described my invention, what I claim is:

1. A mass candler, comprising a casing having a feeding portion and an inspection portion, an endless horizontally arranged conveyor supported by said casing, said conveyor including a series of egg-supporting rollers for receiving and conveying eggs progressively from one end of said casing to the other, said rollers being spaced apart and arranged so as to support eggs in longitudinal alignment therewith, drive means for intermittently driving said conveyor, a source of light located in the inspection portion of said casing, a reach rod carried by said casing and oscillably supported in the inspection portion thereof, a spinner belt supported by said rod, means for actuating said belt, means actuated by said drive means for elevating said rod to bring said belt to bear against the rollers at said inspection portion during periods of interrupted motion of said conveyor, whereby the eggs carried by said last mentioned rollers will be rotated to expose their contents to inspection.

2. A mass candler, comprising a casing having a feeding portion and an inspection portion, an endless horizontally arranged conveyor supported by said casing, said conveyor including a series of egg-supporting rollers for receiving and conveying eggs progressively from one end of said casing to the other, said rollers being spaced apart and arranged so as to support eggs in longitudinal alignment therewith, drive means for intermittently driving said conveyor, a source of light located in the inspection portion of said casing, a reach rod disposed in the inspection portion of said casing, a spinner belt associated with said rod, means for actuating said belt, links carried by said casing for pivotally supporting said rod, a cam arm carried by said rod, a cam rotatably carried by said casing and connected with said drive means to engage said cam arm for elevating said rod to bring said spinner belt into bearing contact with the rollers in said inspection portion, whereby the eggs carried by said last mentioned rollers will be rotated to expose their contents to inspection.

3. An egg candling device comprising a casing, an endless horizontally arranged conveyor supported by said casing and including a series of spaced egg-supporting rollers for receiving and conveying eggs, a source of light mounted on said casing beneath said conveyor, stationary shield means mounted above said conveyor in registry with said light source, said shield means comprising a series of generally parallel shield members disposed in spaced relation transversely of said rollers, adjacent shield members having cooperative side edges defining longitudinally spaced egg receiving openings, drive means connected to said conveyor for imparting step-by-step longitudinal movement to said rollers, said shield means being positioned longitudinally relative to said conveyor whereby each stepped movement of the conveyor places an adjacent pair of rollers in straddling relation to an egg receiving opening, and means connected to said drive means for intermittently spinning all rollers above said light source in timed relation to said step-by-step movement of said conveyor whereby the contents of an egg will be spinning during such period of time as an egg is stationarily positioned in one of said opening.

4. An egg candler device comprising a casing,
an endless conveyor supported by said casing,
said conveyor including a series of spaced apart egg-supporting rollers for receiving and conveying eggs from a feeding portion of the device to an inspection portion thereof,
an illumination system for directing light from subjacent the conveyor through the inspection portion of the device,
a main drive,
apparatus interconnected with said main drive for driving said conveyor to impart step-by-step movement to the rollers from the feeding portion through the inspection portion of the device and for holding the conveyor translatorily immobile relative thereto,
structure for rotating eggs which may be supported by the rollers of the conveyor while the conveyor is translatorily immobile to expose the contents of such eggs for inspection,
said structure including means operatively connected with the main drive for rotating the rollers of the conveyor which may be located in the inspection portion of the device, and
other means actuated by said apparatus and automatically operable in timed relationship therewith for enabling the first mentioned means to intermittently engage the rollers of the conveyor and rotate same to thus rotate such eggs which may be supported thereby during the intervals when said conveyor is translatorily immobile.

References Cited in the file of this patent

UNITED STATES PATENTS

| | | |
|---|---|---|
| 1,663,704 | Holzmann | Mar. 27, 1928 |
| 1,677,656 | Roberts et al. | July 17, 1928 |
| 1,728,462 | Wyland | Sept. 17, 1929 |
| 2,007,195 | Haugh | July 9, 1935 |
| 2,044,981 | Guttman | June 23, 1936 |
| 2,070,980 | Wyland | Feb. 6, 1937 |
| 2,520,610 | Powell | Aug. 29, 1950 |
| 2,864,281 | Draper | Dec. 16, 1958 |